US010603839B2

(12) United States Patent
Lan

(10) Patent No.: US 10,603,839 B2
(45) Date of Patent: Mar. 31, 2020

(54) 3D PRINTING APPARATUS AND METHOD OF USING THE SINGLE-PRINTHEAD ACHIEVED MULTI-MATERIAL AND MULTI-SCALE PRINTING

(71) Applicant: Qingdao Technological University, Qingdao, ShanDong Province (CN)

(72) Inventor: Hongbo Lan, Qingdao (CN)

(73) Assignee: QINGDAO TECHNOLOGICAL UNIVERSITY, Qingdao (CN)

( * ) Notice: Subject to any disclaimer, the term of this patent is extended or adjusted under 35 U.S.C. 154(b) by 0 days.

(21) Appl. No.: 15/516,301

(22) PCT Filed: Aug. 23, 2016

(86) PCT No.: PCT/CN2016/096337
§ 371 (c)(1),
(2) Date: Mar. 31, 2017

(87) PCT Pub. No.: WO2017/071388
PCT Pub. Date: May 4, 2017

(65) Prior Publication Data
US 2018/0229433 A1 Aug. 16, 2018

(30) Foreign Application Priority Data
Oct. 30, 2015 (CN) .......................... 2015 1 0732961

(51) Int. Cl.
*B29C 64/209* (2017.01)
*B22F 3/00* (2006.01)
(Continued)

(52) U.S. Cl.
CPC .......... *B29C 64/209* (2017.08); *B01F 3/0853* (2013.01); *B01F 7/00416* (2013.01);
(Continued)

(58) Field of Classification Search
CPC ....... B29C 64/209; B33Y 10/00; B33Y 30/00; B33Y 50/00
See application file for complete search history.

(56) References Cited

U.S. PATENT DOCUMENTS 6,401,001 B1 6/2002 Jang et al.
7,270,528 B2 * 9/2007 Sherwood ........... B29C 35/0805
425/174.4
(Continued)

FOREIGN PATENT DOCUMENTS

CN 103753817 A 4/2014
CN 104552944 A 4/2015
(Continued)

OTHER PUBLICATIONS

International Search Report dated Nov. 11, 2016 for International Application No. PCT/CN2016/096337 filed Aug. 23, 2016, 5 pages.

*Primary Examiner* — Jacob T Minskey
*Assistant Examiner* — Melody Tsui
(74) *Attorney, Agent, or Firm* — Knobbe, Martens, Olson & Bear, LLP

(57) ABSTRACT

The present invention discloses a 3D printing apparatus and method of using a single-printhead to achieve multi-material and multi-scale printing. The apparatus comprises a base, a worktable, a wafer stage, a substrate, a power source, a printhead, and a support. The printhead is provided with a plurality of material inlets, each of which is connected to a different micro-feeding pump; and multiple materials are thoroughly mixed under the action of an agitator after being fed into the printhead, thereby achieving multi-material printing. In the present invention, a macroscopic geometrical shape of a printed object, microstructures in the interior and on the surface of the object are reasonably controlled, and integrated manufacturing of multi-scale structures is achieved.

13 Claims, 3 Drawing Sheets

(51) Int. Cl.
*B33Y 10/00* (2015.01)
*B33Y 70/00* (2020.01)
*B29C 64/386* (2017.01)
*B29C 64/291* (2017.01)
*B28B 1/00* (2006.01)
*B29C 64/336* (2017.01)
*B29C 64/35* (2017.01)
*B29C 64/245* (2017.01)
*B01F 3/08* (2006.01)
*B01F 7/00* (2006.01)
*B33Y 50/00* (2015.01)
*B33Y 30/00* (2015.01)
*B01F 7/24* (2006.01)

(52) U.S. Cl.
CPC .............. *B01F 7/248* (2013.01); *B22F 3/008* (2013.01); *B28B 1/001* (2013.01); *B29C 64/245* (2017.08); *B29C 64/291* (2017.08); *B29C 64/336* (2017.08); *B29C 64/35* (2017.08); *B29C 64/386* (2017.08); *B33Y 10/00* (2014.12); *B33Y 30/00* (2014.12); *B33Y 50/00* (2014.12); *B33Y 70/00* (2014.12); *B01F 2215/0059* (2013.01)

(56) References Cited

U.S. PATENT DOCUMENTS

| | | | |
|---|---|---|---|
| 8,142,860 B2* | 3/2012 | Vanmaele | B41C 1/003 427/514 |
| 9,527,241 B2 | 12/2016 | Levine et al. | |
| 2003/0143268 A1* | 7/2003 | Pryce Lewis | A61J 3/10 424/464 |
| 2015/0057781 A1* | 2/2015 | Din | G05B 19/4086 700/98 |
| 2016/0106142 A1* | 4/2016 | Contractor | A23P 20/20 426/231 |
| 2017/0066198 A1* | 3/2017 | Ur | B33Y 10/00 |

FOREIGN PATENT DOCUMENTS

| | | |
|---|---|---|
| CN | 104786506 A * | 7/2015 |
| CN | 104786506 A | 7/2015 |
| CN | 105196550 A | 12/2015 |
| CN | 205058637 U | 3/2016 |
| JP | 2015120343 A | 7/2015 |
| WO | WO 2015/102773 A1 | 7/2015 |

* cited by examiner

3D PRINTING APPARATUS AND METHOD OF USING THE SINGLE-PRINTHEAD ACHIEVED MULTI-MATERIAL AND MULTI-SCALE PRINTING

RELATED APPLICATIONS

The present application is the U.S. National Phase of International Application No. PCT/CN2016/096337, entitled "A 3D PRINTING APPARATUS AND METHOD OF USING THE SINGLE-PRINTHEAD ACHIEVED MULTI-MATERIAL AND MULTI-SCALE PRINTING," filed Aug. 23, 2016, which designated the United States, and claims the benefit of priority to Chinese Application No. 2015107329616, filed Oct. 30, 2015.

FIELD OF THE INVENTION

The present invention belongs to the technical field of additive manufacturing, and specifically relates to a 3D printing apparatus and method of using the single-printhead achieved multi-material and multi-scale printing.

BACKGROUND OF THE INVENTION

There is a huge need for integrated manufacture of multi-material and macro/micro/nano multi-scale structures in the fields of new materials (composites, metamaterials, functionally graded materials, porous lightweight materials, smart materials, nonhomogeneous materials, etc.), tissue engineering, biomedicine, MEMS, 4D printing, electronic products, flexible electronics (wearable electronic devices, etc.), aerospace, automobiles, etc. For example, in the biomedical field, in order to print a device including both a flexible material capable of moving along with knees and rigid electronic elements, a 3D printer should uninterruptedly perform all the following tasks: seamless transition from a flexible material to a rigid material, circuit printing using inks with various conductivities and resistances, and precise switching between the various ink print materials. To achieve such a capability of integrating different materials and properties in a printed product, the printing of the product requires a multi-material and multi-scale 3D printing process. In addition, implementations of function-driven integrated design and manufacturing of materials, structures, and functional components, and form control and performance control techniques in 3D printing also need powerful support from multi-material and multi-scale additive manufacturing techniques and devices.

However, most of the existing 3D printing processes employ single-material printing, and even some existing multi-material 3D printing processes are mainly based on the multi-printhead technique. Nevertheless, the processess based on multiple printheads have many shortcomings and limitations: (1) active mixing of multiple materials can not be achieved; (2) accurate control on various components of the multiple materials can not be achieved; (3) seamless transition between the multiple materials (e.g., seamless transition from a flexible material to a rigid material) can not be achieved; (4) the configured number of printheads and the number of types of printable materials are limited; (5) structures with multiple printheads and operations thereof are complicated, and the device cost; (6) frequent switching is required between printheads, leading to low printing efficiency; (7) it is difficult to print with high-viscosity liquid materials, leading to limit to the types of materials available for printing; (8) it is difficult to achieve macro, micro and nano cross-scale/multi-scale integrated manufacturing; and (9) the performance control in 3D printing is very poor. In addition, printheads for multiple materials generally include a plurality of printheads installed at the same height in parallel, wherein each printhead may handle one material, and typically, only one printhead operates during printing, and other standby printheads at the same height may interfere with constructing a tissue forming surface. Hence, it is difficult to achieve integrated manufacturing of multi-material and multi-scale structures using the existing 3D printing techniques.

Micro-scale 3D printing based on electrohydrodynamics (EHD) (Electronic Jet Printing), which is also referred to as electrohydrodynamic jet printing (E-jet), is a novel micro/nano-scale 3D printing technique emerging in recent years. It is a micro-droplet jet forming and deposition technique based on electrohydrodynamics (EHD). Different from the traditional jet printing techniques (hot jet printing, piezoelectric jet printing, etc.) with a "pushing" mode, EHD jet printing adopts electric field driving to generate very fine jets from the top end of a liquid cone (Taylor cone) in a "pulling" mode. As the electronic jet printing adopts a mode of drop-on-demand jet printing in the cone-jet mode, very uniform droplets can be generated and patterns with high precision can be formed; moreover, the print resolutions are not limited by the diameters of nozzles, and complex three-dimensional micro/nano structures can be manufactured with submicron-scale and nano-scale resolutions on the premise that the nozzles are not prone to blocking. Furthermore, a very extensive range of materials may be available for the electronic jet printing, ranging from insulating polymers to conducting polymers, from suspensions to single-walled carbon nanotube solutions, from metal materials and inorganic functional materials to biomaterials, etc. Therefore, compared with the existing 3D printing techniques, the present invention has already shown outstanding advantages and potentials in the aspects of cost, efficiency, controllability, print area (in connection with the roll-to-roll process), etc., and also has the characteristics of good compatibility (an extensive range of suitable materials, and particularly many high-viscosity materials), simple structure, and high resolution, and especially, has the particularly prominent potential in multi-material and cross-scale 3D printing. However, the existing multi-material electronic jet printing is mainly based on a multi-printhead solution with the shortcomings and limitations of the existing multi-printhead solution.

Hence, to overcome the shortcomings and drawbacks of the existing 3D printing and additive manufacturing in the aspect of integrated manufacturing of multi-material and macro/micro/nano multi-scale structures and to achieve "function-driven integrated seamless integration of structures, materials and performance design and manufacturing", design elements, such as materials, microstructures, macrostructures, and the like, are combined with functional requirement goals to achieve form control and performance control manufacturing (especially improvement and optimization of the performance of products through the use of multiple materials and microstructure arrangements to add new functions) of complex tissue structures and meet the practical requirements of research and development and mass production in the aspects of new material development, biomedicine, electronic products, tissue engineering, MEMS, wearable electronic devices, 4D printing, etc. Then, there is an urgent need for development of a new process and equipment for multi-material and multi-scale 3D printing.

SUMMARY OF THE INVENTION

In order to solve the technical problems in the prior art, the present invention provides a 3D printing apparatus and method of using the single-printhead achieved multi-material and multi-scale printing.

The apparatus achieves integrated manufacturing of multi-material and multi-scale structures with improved form control and performance control capabilities in 3D printing.

To achieve the above objective, the present invention uses the following technical solution.

A 3D printing apparatus of using the single-printhead achieved multi-material and multi-scale printing comprises a printhead for jet printing with a single material or multiple materials after mixing. The printhead comprises a feed compartment, a mixing chamber disposed at a lower end of the feed compartment, and a nozzle disposed at a lower end of the mixing chamber. A plurality of material inlets are formed in a sidewall of the feed compartment, and a mixing agitator for agitating multiple materials is disposed in the mixing chamber.

Preferably, a waste liquid collector for leading a material out of the printhead is disposed in the mixing chamber. The waste liquid collector is a waste liquid collecting pipe in which an integrated pump is built, and the waste liquid collecting pipe has one end disposed within the mixing chamber, and the other end communicating with the outside.

The waste liquid collector is used for recovering the material residual in the printhead by means of vacuum negative pressure. For material switching, the waste liquid collector is started to recover the residual print material in the printhead thereto. The vacuum pressure in the waste liquid collector is −500 mbar.

Preferably, the printhead is provided with an air inlet that is connected to a pressure pipe. Air is fed into the air inlet, thereby being conducive to ejecting the material in the printhead. An operating range of the pressure pipe is 0.1-1 bar. An operating range of the vacuum pipe is below −0.2 bar. A pneumatic pressure which is stable and accurately adjustable is provided for the whole jet printing system to drive a fluid.

Preferably, the mixing agitator comprises a motor, a screw blade, and an end cap. The end cap covers an upper end of the feed compartment; the motor is mounted at a lower end of the end cap; and the screw blade is mounted within the mixing chamber at a lower end of the motor and connected to the motor by means of a transmission shaft. The mixing agitator disposed in the middle mixing chamber is used for thoroughly agitating and evenly mixing print materials from different material inlets.

Preferably, the nozzle is a conductive nozzle, which is a metal nozzle or is coated with a conducting material, and has an inner diameter of 0.5-100 μm.

The conductive nozzle may achieve electronic jet printing using a high-voltage electric field. The electronic jet printing has the following advantages: the printing droplets have a small diameter, and submicron-scale and nano-scale jet printing resolutions may be achieved, so that a microstructure of an object may be printed, thus achieving printing of macro/micro multi-scale structures; the print materials are widely available, and insulative or conductive liquids, organic and inorganic materials, and various solutions or suspensions can all be used for printing; the printhead is not prone to blockage, because in the electronic jet printing, fluid is drawn out of the nozzle by using strong electric field force and the problem of nozzle blockage due to too high fluid viscosity can be overcome; and high precision is achieved. Due to a very small distance between the nozzle and the receiving substrate, location errors caused by air disturbance and the like can be reduced to achieve high precision and good controllability. In addition, the electric jet printing is very suitable for complex jet printing with high precision.

Preferably, there are not less than 2 material inlets, each of which is connected to a micro-injection pump. A plurality of material inlets are provided, which may be connected to the micro-injection pumps for multiple materials, thereby achieving multi-material 3D printing.

The 3D printing apparatus of using the single-printhead achieved multi-material and multi-scale printing further comprises a base, a worktable, a wafer stage, a substrate, a power source, the printhead described above, and a support. The base is mounted at the bottom; the support and the worktable are both disposed over the base, and the printhead is mounted on the support. The wafer stage is fixed on the worktable, and the substrate is fixed on the wafer stage. A positive pole and a negative pole of the power source are connected to the nozzle of the printhead and the wafer stage, respectively. By means of relative motions between the worktable and the support, relative motions in x direction, y direction and z direction between the printhead and the substrate are achieved.

The three-dimensional relative motions between the printhead and the substrate are suitable for accurately printing a three-dimensional object, thereby achieving multi-axial printing of the object.

Preferably, the worktable is an x-y worktable, and the support is a z-direction worktable, wherein the printhead is mounted on the z-direction worktable, and the substrate is fixed on the x-y worktable; the printhead moves in z direction, and the substrate moves in x direction and y direction, such that the relative motions in x direction, y direction and z direction between the printhead and the substrate are achieved;

or, the x-y worktable is mounted at the lower end of the support, and the support is the z-direction worktable, wherein the printhead is mounted on the z-direction worktable, such that motions of the printhead in x direction, y direction and z direction are achieved.

Preferably, the wafer stage is a vacuum chuck made of a metal material, wherein an air inlet of the vacuum chuck is connected to a vacuum pipe, and the wafer stage fixes the substrate by means of vacuum negative pressure.

Further preferably, the wafer stage is also provided with an electric heating device that is an electric heating rod or an electric heating sheet. The electric heating device may heat a print material to achieve rapid curing of the print material.

Preferably, a print material for the single-printhead apparatus useful in multi-material and multi-scale 3D printing is a solution that comprises an organic polymer, an inorganic functional material, a biomaterial, nanoparticles, a conducting material, graphene, and carbon nanotubes or a liquid composite containing nanoparticles.

Preferably, the single-printhead apparatus useful in multi-material and multi-scale 3D printing further comprises a UV-curable light source that is disposed directly above the substrate and provides an exposure light source irradiating an area of a print material deposited on the substrate to cure a UV light-sensitive material.

Preferably, a camera or a visual detection module is disposed in the vicinity of the nozzle of the printhead and used for monitoring an actual electronic jet printing process and aligning patterns in the jet printing process.

An operating method of the 3D printing using the single-printhead achieved multi-material and multi-scale printing comprises the following steps:

fixing the substrate on the wafer stage, adjusting an operating distance between the nozzle and the substrate, feeding, by micro-feeding pumps, materials into the printhead, and after thoroughly mixing multiple materials by the mixing agitator in the printhead, ejecting under the action of an intake pressure of the printhead and an electric field between the nozzle and the wafer stage a mixed solution from the nozzle for printing on the surface of the substrate;

when a print material is required to be switched, starting the waste liquid collector to suck out the material residual in the printhead, and then filling with a new material to continue with printing; and when printing of a macrostructure or micron-scale structure or nano-scale structure of a different scale is needed, changing the distance between the nozzle and the substrate, and a voltage between the nozzle and the wafer stage for printing; and proceeding until the printing is completed.

Preferably, the operating distance between the nozzle and the substrate is 0.01-3 mm.

Preferably, the intake pressure of the printhead is 0.1-1 bar, and the vacuum pressure in the waste liquid collector is −400 to 500 mbar.

Preferably, the power source between the nozzle and the wafer stage has an output pulse voltage of 0.2-5 KV, an output pulse frequency of 10-1000 Hz, and a square output waveform.

The present invention is applicable to the fields of new materials (composites, metamaterials, functionally graded materials, porous lightweight materials, smart materials, nonhomogeneous materials, etc.), tissue engineering, biomedicine, MEMS, 4D printing, electronic products, flexible electronics (wearable electronic devices, etc.), aerospace, automobiles, and the like, and in particular to industrial-level mass production in the fields of tissue engineering, functionally graded materials, porous lightweight materials, metamaterials, smart materials, wearable electronic devices, consumer electronics, embedded sensors, MEMS, etc.

The present invention has the following beneficial effects:

(1) In the present invention, a plurality of material inlets are provided, each of which is connected to a different micro-feeding pump; and multiple materials are thoroughly mixed under the action of an agitator after being fed into the printhead, thereby achieving multi-material printing; the relative motions in x direction, y direction and z direction may be achieved between the printhead and the substrate of the present invention, and therefore, a macroscopic geometrical shape of a printed object, and microstructures in the interior and on the surface of the object are reasonably controlled.

(2) The nozzle of the printhead of the present invention is a conductive nozzle, and the electronic jet printing mode is used in a high-voltage electric field for printing, and therefore, accurate printing of a microstructure of an object can be achieved; macro and micro multi-scale printing of an object is achieved by adjusting the distance between the nozzle and the substrate, and a complex three-dimensional micro/nano structure (microstructure) is simultaneously manufactured on the surface and in the interior of the object.

(3) According to the present invention, a material in the printhead may be sucked out by means of the waste liquid collector for changing the material; thus, rapid replacement of multiple materials in the printing process and real-time regulation of material components are achieved, and the problem of multi-material integration is solved; and by changing material components and proportions thereof in the printing process, seamless and accurate transition among a flexible material, a rigid material and an electronic circuit is achieved under the condition of not stopping printing. Therefore, an industrial solution is provided for industrial production of wearable devices and electronic devices.

(4) The agitator is disposed within the printhead of the present invention to achieve active, fast, complete, thorough and even mixing of multiple materials in the printing process; and the micro-feeding pumps can achieve accurate control on various components.

(5) The present invention is good in material compatibility, and applicable to printing of high-viscosity liquids, thereby solving the difficult problem of printing of high-viscosity materials and reactive materials (e.g., AB epoxy resin adhesive), and is suitable for various materials including biomaterials, metal nanoparticles, ceramic materials, organic functional materials, etc.; and integrated printing of liquid and nano-materials may be achieved.

(6) The present invention employs one single printhead for printing by means of electronic jet printing, and thus overcomes the drawbacks and shortcomings of existing multi-printhead printing; multi-material and multi-scale 3D printing is achieved while employing one single printhead for the electronic jet printing, and the functions and application fields of printing are expanded. Additionally, the present invention is simple in structure and operation, low in cost, and high in efficiency.

REFERENCE NUMERALS

1—base, 2—x-y worktable, 3—wafer chuck, 4—substrate, 5—high-voltage power source, 6, print material, 7—printhead, 8—connecting bracket, 9—mixing agitator, 10—waste liquid collector, 11—z-direction worktable, 12—support, 13—vacuum pipe, 14—pressure pipe, 15—feed compartment, 16—material inlet, 17—transmission shaft, 18—mixing chamber, 19—nozzle, 20—end cover, 21—stepping motor, and 22—screw blade.

DETAILED DESCRIPTION OF THE EMBODIMENTS

The present invention will be further described in conjunction with the accompanying drawings and the embodiments.

Embodiment 1

Figure 1:
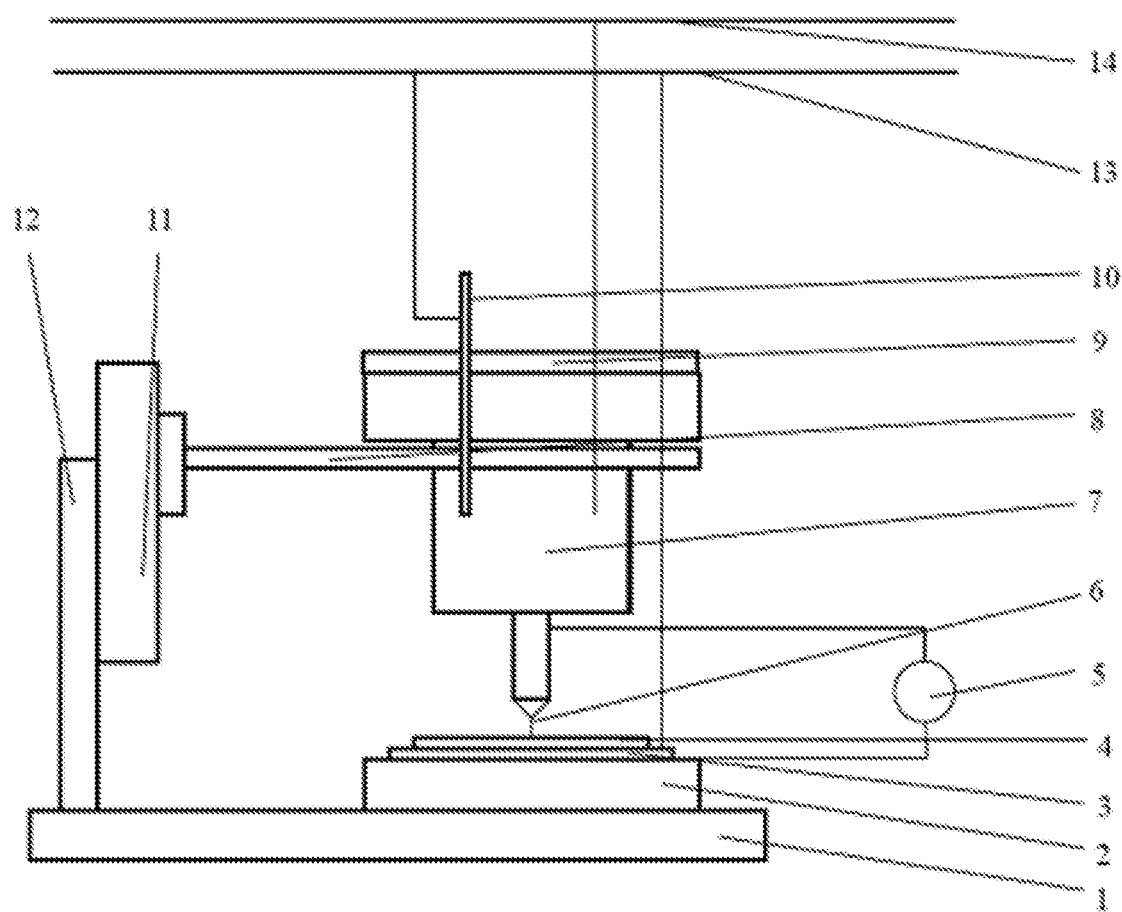
FIG. 1 is a structural schematic diagram of embodiment 1 of the present invention.

FIG. 1 is a structural schematic diagram of an apparatus useful in multi-material and multi-scale 3D printing of the present invention. The apparatus useful in multi-material and multi-scale 3D printing comprises a base 1, an x-y worktable 2, a wafer stage 3, a substrate 4, a high-voltage power source 5, a print material 6, a printhead 7, a connecting bracket 8, a mixing agitator 9, a waste liquid collector 10, a z-direction worktable 11, a support 12, a vacuum pipe 13, and a pressure pipe 14, wherein the base 1 is disposed at the bottom, and the x-y worktable 2 is disposed on the base 1; the wafer stage 3 is fixed on the x-y worktable 2; the substrate 4 is fixed on the wafer stage 3; the printhead 7 is disposed directly above the substrate 4, and fixed on the connecting bracket 8; the connecting bracket 8 is fixed to the z-direction worktable 11; the z-direction worktable 11 is fixed on the support 12; the support 12 is fixed on the base 1; a mixing agitator 9 is disposed within the printhead 7, and an upper portion of the mixing agitator 9 is fixed to the upper surface of the printhead, and the lower portion of the mixing agitator 9 is placed in a mixing chamber 18 within the printhead 7; the lower portion of the waste liquid collector 10 is placed in the mixing chamber 18 of the printhead 7; an air inlet is formed in the upper portion of the waste liquid collector 10, and connected to the vacuum pipe 13; the wafer stage 3 is provided with an air inlet that is connected to the vacuum pipe 13; the printhead 7 is provided with an air inlet that is connected to the pressure pipe 14; the high-voltage power source 5 is disposed between a conductive nozzle 19 located at the bottommost portion of the nozzle 7 and the substrate 4, and wherein one side of the wafer stage 3 fixing the substrate 4 is connected to a negative pole, and the nozzle 19 is connected to the positive pole of the high-voltage power source 5.

The x-y worktable 2 is a two-dimensional precision displacement table for achieving motions of the substrate 4 in x-y directions, the motions cooperating with the vertical motions of the printhead 7 in z direction to accomplish manufacturing of each layer of structure. An LS-180 linear displacement table is employed with an operating stroke of 150 mm and two-way repositioning accuracy of ±0.1 micron.

The wafer stage 3 is a vacuum chuck made of a metal material. The air inlet formed in the wafer stage 3 is connected with the vacuum pipe, and absorption and fixation of the substrate 4 are achieved by means of vacuum negative pressure. The wafer stage 3 is also provided with an electric heating sheet.

The high-voltage power source 5 is a high-voltage pulse power source having an output pulse voltage continuously adjustable in a range of 0-4 KV, an output pulse frequency of 10-1000 Hz, and a square output waveform.

The print materials 6 shown in this embodiment are four materials that are fed into the feed compartment 15 of the printhead 7 via the material inlets 16 formed in the printhead 7, respectively. The print materials 6 may be supplied to the feed compartment 15 of the printhead 7 by precise micro-injection pumps, respectively. The precise micro-injection pumps are connected to the material inlets by using teflon hoses.

Figure 2:
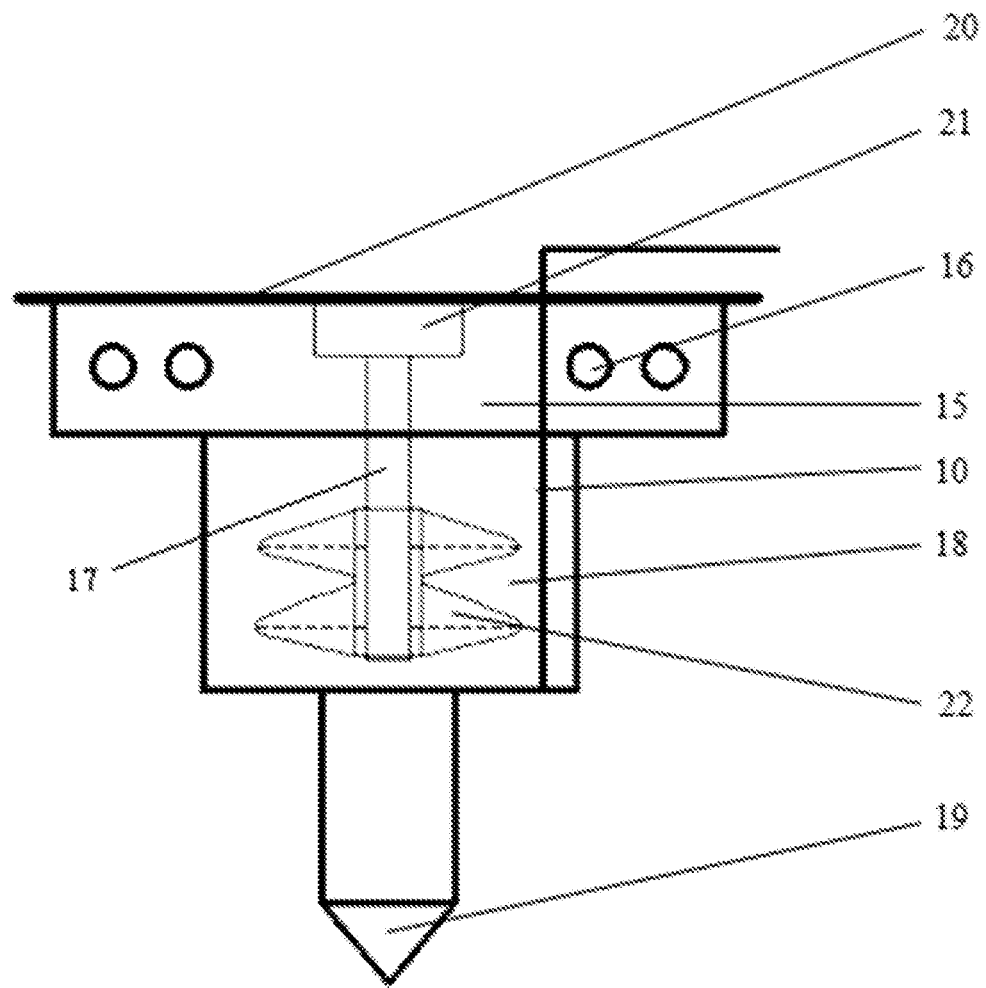
FIG. 2 is a structural schematic diagram of a printhead in the present invention.

As shown in FIG. 2, the printhead 7 comprises three portions: the feed compartment 15 as an upper portion, the mixing chamber 18 as a middle portion, and the conductive nozzle 19 as a lower portion, wherein the feed compartment 15 is uniformly provided with four material inlets 16, and materials enter into the feed compartment 15 of the printhead 7 via the material inlets 16, respectively. A screw blade 22 of the mixing agitator 9 disposed in the middle mixing chamber 18 is used for thoroughly agitating and evenly mixing the print materials 6 from different material inlets 16. The nozzle 19 at the bottommost portion of the printhead 7 is the conductive nozzle. A hollow stainless steel nozzle having an inner diameter of 0.5 micron is used in this embodiment.

The mixing agitator 9 comprises an end cap 20, a stepping motor 21, and a screw blade 22, wherein the screw blade 22 is connected to the stepping motor 21 by means of a transmission shaft 17; the stepping motor 21 is fixed to the lower end face of the end cap 20; and the end cap 20 is fixed to the upper end of the feed compartment 15 of the printhead 7.

The waste liquid collector 10 is used for recovering a material residual in the printhead 7 by means of vacuum negative pressure. For material switching, the waste liquid collector 10 is started to recover the print materials 6 residual in the printhead 7 thereto. An integrated pump is built in the waste liquid collector. The vacuum pressure in the collector is −500 mbar.

The printhead 7, the mixing agitator 9 and the waste liquid collector 10 form an intelligent and active mixing multi-material printing printhead system that achieves the functions of supply of multiple materials, even mixing of the multiple materials, waste recovery, and the like, as shown in FIG. 2.

The z-direction worktable 11 is an M-501 ultra-precise z-axis displacement table from PI company, which has a repeatability precision of 0.1 micron. The operating distance between the nozzle 19 at the bottom of the printhead 7 and the substrate 4 is 200 microns.

The operating range of the pressure pipe is 0-1 bar; and the operating range of the vacuum pipe is below −0.2 bar.

A high-speed camera or a visual detection module may be disposed in the vicinity of the nozzle for monitoring an actual electronic jet printing process and aligning patterns in the jet printing process. The apparatus may comprise a UV-curable light source that is disposed directly above the substrate to achieve curing of a UV light-sensitive material.

Embodiment 2

Figure 3:
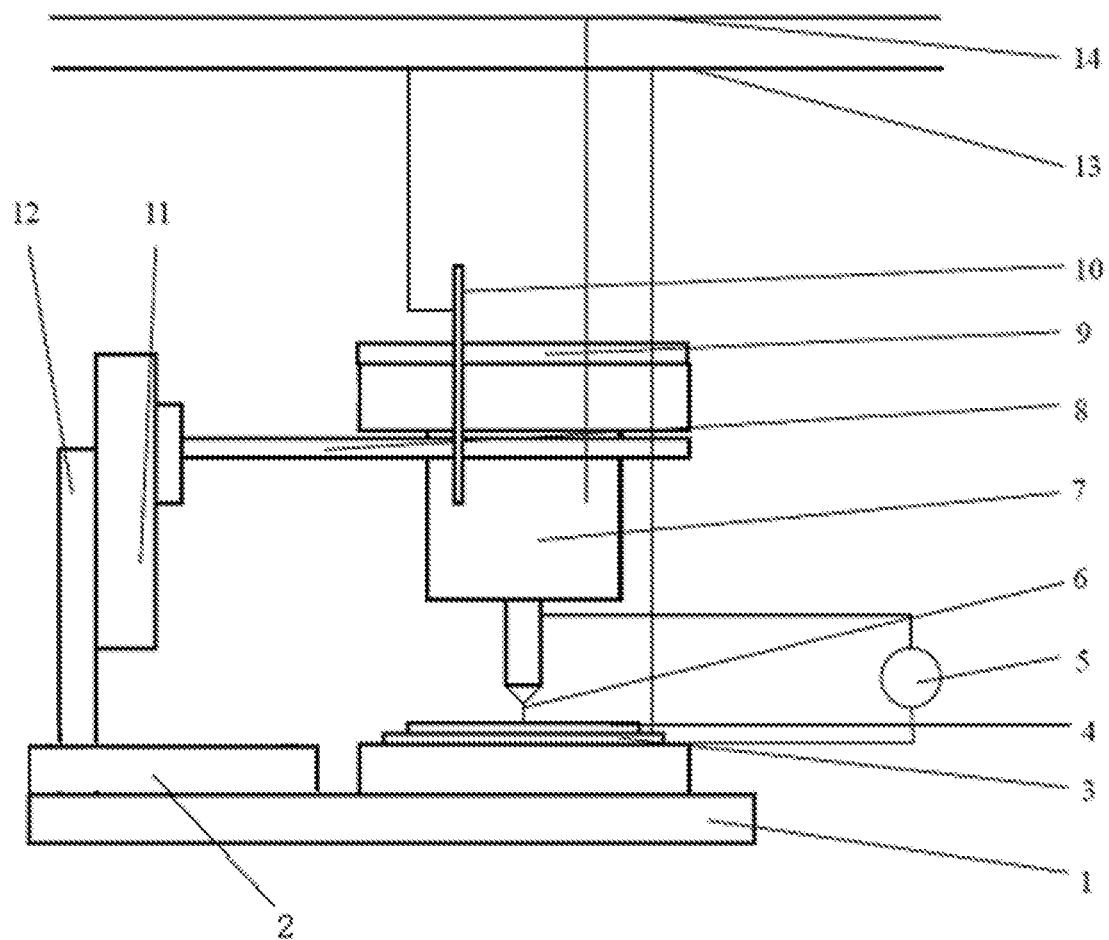
FIG. 3 is a structural schematic diagram of embodiment 2 of the present invention.

As shown in FIG. 3, which is a structural schematic diagram of an apparatus useful in multi-material and multi-scale 3D printing of the present invention, the apparatus comprises a base 1, an x-y worktable 2, a wafer stage 3, a substrate 4, a high-voltage power source 5, a print material 6, a printhead 7, a connecting bracket 8, a mixing agitator 9, a waste liquid collector 10, a z-direction worktable 11, a support 12, a vacuum pipe 13, and a pressure pipe 14, wherein the base 1 is disposed at the bottom, and the x-y worktable 2 is disposed on the base 1; the wafer stage 3 is fixed on the base 1; the substrate 4 is fixed on the wafer stage 3; the printhead 7 is disposed directly above the substrate 4, and fixed on the connecting bracket 8; the connecting bracket 8 is fixed to the z-direction worktable 11; the z-direction worktable 11 is fixed on the support 12; and the support 12 is fixed on the x-y worktable 2 that is fixed on the base 1.

The x-y worktable 2 is a two-dimensional precision displacement table for achieving motions of the support 12 in x-y directions, and the printhead 7 moves up and down in z direction to accomplish manufacturing of each layer of structure. An LS-180 linear displacement table is employed with an operating stroke of 150 mm and two-way repositioning accuracy of ±0.1 micron.

While the specific embodiments of the present invention are described above in conjunction with the accompanying drawings, they are not intended to limit the protection range of the present invention. Those skilled in the art will understood that various modifications or variations that may be made by those skilled in the art on the basis of the technical solutions of the present invention without creative effort are still within the protection scope of the present invention.

The invention claimed is:

1. A 3D printing apparatus for multi-material and multi-scale printing, comprising a base, a worktable, a wafer stage, a substrate, a power source, a printhead, and a support, wherein the printhead comprises a feed compartment, a mixing chamber disposed at a lower end of the feed compartment, and a conductive nozzle disposed at a lower end of the mixing chamber, a plurality of material inlets being formed in a sidewall of the feed compartment, and a mixing agitator for agitating a plurality of materials disposed in the mixing chamber;

the base is mounted at the bottom, the support and the worktable being both disposed over the base, and the printhead being mounted on the support; the wafer stage is fixed on the worktable, and the substrate is disposed over the wafer stage and located below the printhead; a positive pole and a negative pole of the power source are connected to the conductive nozzle of the printhead and the wafer stage, respectively; and by means of relative motions between the worktable and the support, relative motions in x direction, y direction and z direction between the printhead and the substrate are achieved, and wherein the wafer stage is a vacuum chuck made of a metal material, and an air inlet of the vacuum chuck is connected to a vacuum pipe; the wafer stage fixes the substrate by means of vacuum negative pressure; and the wafer stage is also provided with an electric heating device comprising an electric heating rod or an electric heating sheet.

2. The 3D printing apparatus according to claim 1, wherein a waste liquid collector for leading a material out of the printhead is disposed in the mixing chamber, and the waste liquid collector comprises a waste liquid collecting pipe in which an integrated pump is built, and the waste liquid collecting pipe has one end disposed within the mixing chamber, and the other end communicating with the outside; and the printhead is provided with an air inlet that is connected to a pressure pipe.

3. The 3D printing apparatus according to claim 1, wherein the mixing agitator comprises a motor, a screw blade, and an end cap, the end cap covering an upper end of the feed compartment, the motor being mounted at a lower end of the end cap, and the screw blade being mounted within the mixing chamber at a lower end of the motor and connected to the motor by means of a transmission shaft.

4. The 3D printing apparatus according to claim 1, wherein the conductive nozzle is a metal nozzle or is coated with a conducting material, and has an inner diameter of 0.5-100 μm.

5. The 3D printing apparatus according to claim 1, wherein the worktable is an x-y worktable; a z-direction worktable is mounted on the support, and the printhead is mounted on the z-direction worktable, and the substrate is fixed on the x-y worktable; and the printhead moves in z direction, while the substrate moves in x direction and y direction, such that the relative motions in x direction, y direction and z direction between the printhead and the substrate are achieved.

6. The 3D printing apparatus according to claim 1, wherein the x-y worktable is mounted at the lower end of the support, the z-direction worktable is mounted on the support, and the printhead is mounted on the z-direction worktable, such that motions of the printhead in z direction, y direction and z direction are achieved.

7. The 3D printing apparatus according to claim 1, further comprising a UV-curable light source that is disposed directly above the substrate and provides an exposure light source irradiating an area of a print material deposited on the substrate, wherein a camera or a visual detection module is disposed in the vicinity of the nozzle of the printhead.

8. An operating method of multi-material and multi-scale printing by using a 3D printing apparatus according to claim 2, comprising the following steps:

fixing the substrate on the wafer stage, adjusting an operating distance between the nozzle and the substrate to a range of about 0.01-3 mm;

feeding materials into the printhead;

mixing materials by the mixing agitator;

ejecting under the action of an intake pressure of the printhead and an electric field between the nozzle and the wafer stage a mixed solution from the nozzle for printing on the surface of the substrate;

when a print material is required to be switched, starting the waste liquid collector to suck out the material residual in the printhead, and then filling with a new material to continue with printing; and when printing of a macrostructure or micron-scale structure or nano-scale structure of a different scale is needed, changing the distance between the nozzle and the substrate, and a voltage between the nozzle and the wafer stage for printing; and proceeding until the printing is completed.

9. The operating method according to claim 8, wherein the power source between the nozzle and the wafer stage has an output pulse voltage of 0.2-5 KV, an output pulse frequency of 10-1000 Hz, and a square output waveform; and the waste liquid collector has a vacuum pressure of −400 to 500 mbar.

10. The 3D printing apparatus of claim 7, wherein the exposure light source is used to cure a UV light sensitive material.

11. The 3D printing apparatus of claim 7, wherein the camera or the visual detection module is used for monitoring an actual electronic jet printing process and aligning patterns in the jet printing process.

12. The operating method according to claim 8, wherein said feeding materials into the printhead is achieved by micro-feeding pumps.

13. The operating method according to claim 8, wherein the intake pressure of the printhead is about 0.1-1 bar.

* * * * *